July 25, 1939.　　　　R. ESTEP　　　　2,167,172
FLOW METER
Filed June 19, 1937
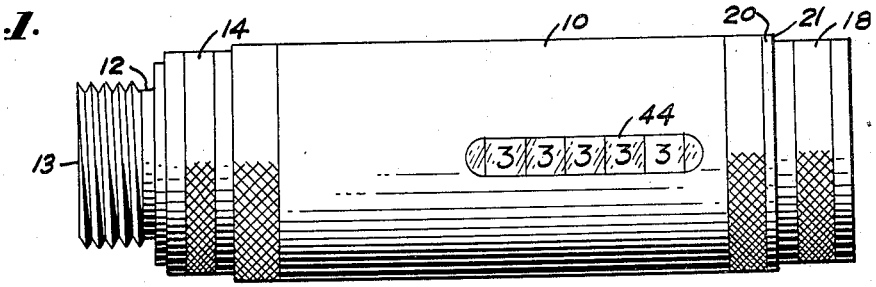
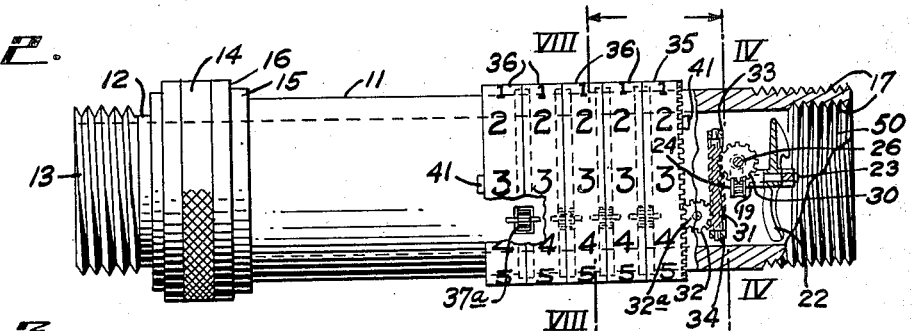
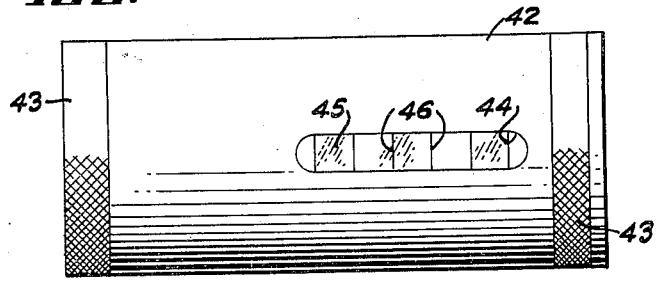
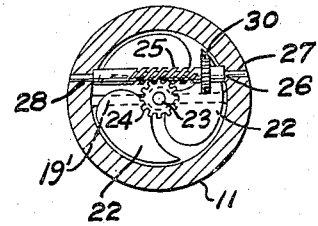
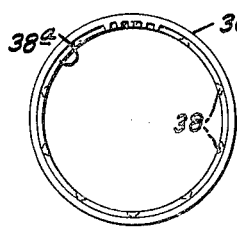
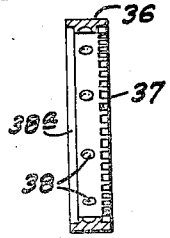
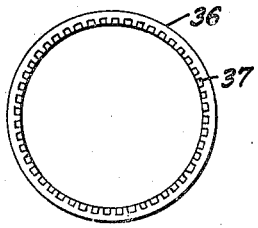
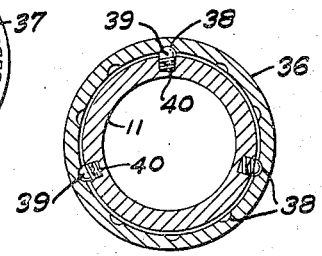
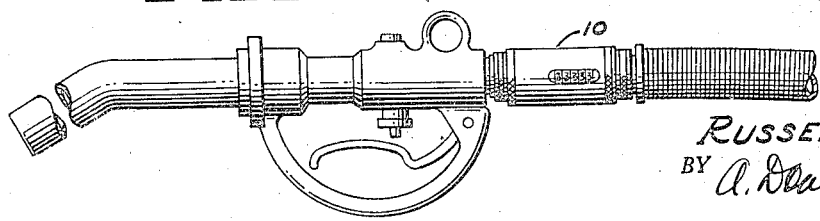
INVENTOR.
RUSSEL ESTEP
BY A. Draham Owen
ATTORNEY Patented July 25, 1939

2,167,172

UNITED STATES PATENT OFFICE 2,167,172

FLOW METER

Russel Estep, King City, Calif., assignor of one-half to Laurent Layous, King City, Calif.

Application June 19, 1937, Serial No. 149,149

10 Claims. (Cl. 73—231)

The present invention relates to devices for measuring the quantity of liquid passing a certain point, and more particularly to a flow meter which not only accurately measures the quantity of liquid at a given point, but also registers the amount for visual observation.

Most of the flow meters which are known and which are in use today are large, cumbersome mechanisms with elaborate by-passes and similar means for measuring the liquid flow. Most of them employ various kinds and types of restricted apertures and valves, and some even elaborate further with complicated electrical control means. All of this demonstrates that liquid flow meters in particular are not intended to have the element of portability.

It is an object of this invention to provide a liquid flow metering device which is thoroughly portable; which employs no valves, or restricted orifices, or electrical connections or circuits to get out of adjustment or repair.

It is an object of the invention to provide a device of this kind of such perfect, delicate and sensitive construction as will accurately measure the volume of liquid flowing past a given point no matter what its position in the line may be.

It is also an object of the invention to provide a flow meter which is capable of attachment at the delivery end of the hose in the dispensing of liquids such as gasoline, oil and the like, whether from stationary pumps or mobile delivery units.

The device of this invention finds particular use in supplying airplanes with gasoline. In the present practice the trucks which dispense gasoline to airplanes are generally equipped with flow meters with large dials located on the truck. To dispense gasoline the driver must start his pump, climb to the top of the plane wing with his hose, and then sit there holding the nozzle open until he thinks he has delivered enough gasoline. For obvious reasons, the trucks cannot be brought too close to the planes, and, as a result, the flow meters on the trucks, even though equipped with large dials, are not readable because of the distance required. Hence, the driver dispenses gasoline without any accurate indication as to how many gallons he is putting into the tank until he is near enough again to the dial to read it. By using the device of this invention, it is now possible for the driver to know exactly and at the point of delivery how many gallons of gasoline are being placed in the tank. It is apparent that other uses will readily occur to those skilled in the art, and that the above is illustrative only.

Further objects are to provide a construction of maximum simplicity, economy and ease of assembly, and such further objects, advantages and capabilities as will later more fully appear, and as are inherently possessed thereby.

The invention further resides in the arrangement, combination and construction of parts illustrated in the accompanying single sheet of drawings, and while there is shown therein a preferred embodiment, it is to be understood that the same is capable of modification, and comprehends other details of construction without departing from the spirit of the invention.

Referring to the drawing:

Fig. 1 is an elevational view of the device complete and ready for attachment in the line;

Fig. 2 is an elevational view of the device with the outer sleeve removed to expose the measuring and registering mechanism;

Fig. 3 is an elevational view of the sleeve;

Fig. 4 is a transverse section taken on the line IV—IV of Fig. 2;

Fig. 5 is a vertical section of one of the circular gears in the counting or registering mechanism;

Fig. 6 is a plan view of one side of the gear;

Fig. 7 is a plan view of the outward side of the circular gear;

Fig. 8 is a section taken on the line VIII—VIII of Fig. 2; and

Fig. 9 is a view showing the flow meter in place with a portion of the gasoline dispensing nozzle and hose.

Like reference characters are used to designate similar parts in the drawing, and in the description of the invention which follows.

Referring more particularly to the drawing disclosing my preferred embodiment, and especially to Figs. 1, 2 and 3, there is generally indicated by the numeral 10 the completed device. This device 10 is built essentially around the cylindrical body member 11 with an inner diameter preferably closely approximating the inner diameter of the liquid line. At one end of this cylindrical member 11,—the outlet end,—the outer diameter is reduced as at 12, and provided with external threads 13 for engagement in the line or attachment to a dispensing nozzle such as shown in Fig. 9.

Adjacent the threaded portion of the outlet end is a knurled collar member 14 which has integral therewith, but of smaller diameter, an annular ring 15, but of larger diameter than the outside diameter of cylinder 11 forming the shoulder 16. The knurled collar 14 is secured to the cylindrical body member 11 in any suitable manner.

The opposite end of the cylindrical body, which is the inlet end 50, is threaded both inside and outside as at 17. The outer threads at 17 receive a collar member 18 which is similar to the collar member 14. The inside threads at 17 are adapted to receive the coupling of the hose or other line of liquid flow.

The liquid in the line enters the inlet end 50 of the device, is measured and registered and then flows on through the device into the dispensing or other outlet. The flow measuring device will be better understood by reference to Fig. 4 in particular. Inside of the cylindrical device near the inlet end 50, and directly across the path of flow and at right angles thereto, is positioned a propeller 22 secured to a shaft 23 which is rotatable in a bearing 19 which is supported axially within the body 11 as by a spider 19'. Attached to the shaft 23 and rotated by the rotation of the propeller 22 is small gear wheel 24 which in turn transmits motion to and actuates the counting and registering mechanism hereinafter described. The rotation of the propeller 22 is so calculated as to make only a definite number of turns for each unit of liquid which passes that particular point.

The counting and registering mechanism of the device is synchronized with the revolutions of the propeller 22 so as to actually register the precise number of units passing through the device at that particular point. The small gear wheel 24 is in mesh with the worm gear 25, located on shaft 26, which runs transversely of the longitudinal axis of the pipe or cylindrical member 11, and is journaled in either side of the cylindrical member 11 at 27 and 28. At one end of said shaft 26 is a small gear wheel 30 which is in mesh with another worm gear 31 journaled on the inside of the cylindrical member 11 at 33 and 34. The worm gear 31 is also in mesh with wheel 32 and its identical counterpart 32a on the outside of member 11, which latter gear wheel is in mesh with the chain of gears of the counting and registering mechanism on the outside of the cylinder 11 and imparts the movement initiated by the revolving of the propeller 22 to the counting mechanism. The first ring gear 35, with which gear wheel 32a is in mesh, will have a speed of rotation dependent upon the number of gears used between the rotating mechanism on the inside of the cylinder 11 and also upon the cut and pitch of the small gears and worm gears used. Thus, the usual mathematical calculations for each is required depending upon the size of the inner and outer diameter of the cylindrical body member, the rotation of the propeller 22 and other factors.

The counting and registering mechanism consists of a plurality of rings 36, preferably the described ring 35 being the first one. These ring gears fit on the outside of the cylindrical body member 11 and have an inside diameter slightly larger than the outside diameter of the cylindrical member 11. Each of these ring gears is provided at each marginal edge on its inside diameter with gear teeth. The gear teeth extend all around the inside diameter on the edge 37 which is closer to the inlet 50. On the edge closer to the outlet end of the device the gear teeth extend throughout only one tenth ($\frac{1}{10}$) of the inside circumference 38a, the other nine tenths being left blank. (See Figs. 5, 6 and 7.) The only difference between the first ring gear 35 and the other ring gears 36 is that in the case of ring gear 35, the gear teeth, which extend all the way around the circumference, and extend axially instead of extending inwardly, have the gear teeth cut in its marginal edge to mesh with the small gear wheel 32a.

Recessed in the cylindrical member 11 and adapted to engage the gear teeth of each abutting ring gear 35 and 36 is a small gear 37a which has an outside circumference exactly one-tenth that of the inside circumference of the ring gears 35 and 36.

The ring gears 35 and 36 are divided into ten equal segments and in the outer surface of these segments are placed indicia from zero to nine. On the inside surface of each of these rings, and in the middle of each segment is small hollow depression 38, which appropriately receives a small ball 39 held under slight tension by spring 40, which is attached to the cylindrical body 11. This slight tension holds the counting ring gear in place until advanced to the next unit. Only a slight tension is required to hold the ring gears in place and should allow the rings to move easily one unit at a time.

In order to prevent lateral movement of the gear rings 35 and 36, there are appropriately spaced around the cylindrical member 11 and fastened therein small guide strips 41. These strips are wide enough to prevent any possible engagement with gear teeth which may be positioned on gear ring 35.

The outer part of the meter housing is the sleeve 42, which is knurled at its marginal outside perimeter as at 43, and which is further provided with a longitudinal air-tight window 44. This longitudinal window permits vision from the outside of the device of numerals on the ring bands or ring gears 35 and 36, and gives the reading of the flow of liquid through the device. The glass 45 or other transparent substance may have marginal divisions 46 indicated on one surface to visually separate the various digits of the register. The sleeve 42 is slipped over the cylindrical body and over the counting and registering means from the inlet end toward the outlet end, and seats at one end upon the annular shoulder 16 of the collar member 14, preferably making an air-tight joint with the collar 14. Then, the collar member 18 is threaded into place with the other end of sleeve 42 seating on the annular shoulder thereof (not shown), and preferably making an air-tight joint between the end 20 of the sleeve 42 and a cooperating shoulder 21 on the collar 18.

The performance of the device in actual use is as follows: When the device is interposed in the line of liquid flow, with the liquid entering the device at the inlet end 50, the liquid in its flow engages the vanes of the propeller 22, causing it to rotate at a speed constant with respect to the volume of liquid passing therethrough. The rotation of the propeller rotates the gear wheel 24, worm gear 25, gear wheel 30, worm gear 31, gear 32 and gear wheel 32a, which is in mesh with ring gear 35. The speed of rotation of ring gear 35 is so controlled by means of the number of gears employed between it and the propeller, and also their cut and pitch, that it will rotate one-tenth of the distance of its outer circumference for each unit of liquid measure passing through the device. Thus, as each unit of liquid measure passes through, gear ring 35 is advanced continuously one digit at a time from zero to nine as long as the flow lasts. As each digit is advanced, the numeral on the outer surface of the ring gear is visible through the window 44. As the ring gear 35 rotates past the numeral nine, the teeth of the gear on side 38a, which is one-tenth of the circumferece, engage the small gear 37a in mesh with the full gear teeth of side 37 of ring gears 36, and cause the first ring gear 36 to rotate one digit. This sort of movement for counting is repeated and continued through each ring in the series for as many rings as are provided.

It is now believed that the device of the invention has been thoroughly explained, as well as its manner of use, and although any suitable material may be used in its construction, the best results appear to be obtained by using rust-proof metals, and if used for inflammable liquids, then the material should be one which will not produce sparks.

I claim:

1. In a meter of the character described, a tubular housing having a bore of substantially uniform diameter, means for connecting said housing to a conduit as a continuation thereof, means disposed entirely within said bore and movable by fluid flowing therethrough proportionately with the quantity of fluid flowing therepast, and registering means actuated by said fluid-moved means, said registering means being arranged concentrically with and surrounding said housing.

2. In a meter of the character described, an inner tubular housing having a bore of substantially uniform diameter, an outer tubular housing concentrically surrounding said inner housing and supporting a transparent portion of greater diameter than said inner housing, means for connecting said inner housing to a conduit as a continuation thereof, means disposed within said bore and movable by a fluid flowing therethrough proportionately with the quantity of fluid flowing therepast, registering means rotatably mounted around said inner housing beneath said transparent portion, and means connecting said registering means to said fluid actuated means to be actuated thereby.

3. In a meter of the character described, an inner tubular housing having a bore of substantially uniform diameter, an outer tubular housing concentrically surrounding said inner housing and supporting a transparent portion of greater diameter than said inner housing, means for connecting said inner housing to a conduit as a continuation thereof, means disposed within said bore and movable by a fluid flowing therethrough proportionately with the quantity of fluid flowing therepast, registering means rotatably mounted circumferentially about said inner housing concentrically within said transparent portion of said outer housing, and means connecting said registering means to said fluid actuated means to be actuated thereby.

4. In a meter of the character described, a tubular housing, a propeller journalled co-axially therein to be turned by fluid flowing through said housing proportionately with the volume of fluid flowing therepast, registering means disposed co-axially of and surrounding said housing and out of the line of flow of liquid therethrough, and drive mechanism between said propeller and said registering means.

5. In a meter of the character described, a tubular outer housing having a transparent portion, a tubular inner housing concentric therewith, a propeller journalled co-axially with said inner housing to be turned by fluid flowing through said inner housing proportionately with the volume of fluid flowing therepast, registering means disposed co-axially about said inner housing and rotatably supported thereby, said registering means being visible through said transparent portion of said outer housing, and means connecting said registering means to said propeller to be actuated thereby.

6. In a meter of the character described, a tubular housing, means for connecting said housing into a conduit as a continuation thereof, means mounted within said housing in the path of fluid flowing therethrough to be moved by the fluid, and registering means comprising a ring revolubly mounted surrounding said housing co-axially therewith, and means connecting said ring to said fluid-moved means to be turned thereby.

7. In a meter of the character described, a tubular housing arranged for passage of fluid longitudinally thereof, means for connecting said housing into a conduit as a continuation thereof, means including a propeller mounted within said housing in the path of fluid flowing therethrough to be moved by the fluid, and registering means comprising a plurality of rings revolubly mounted circumferentially about and surrounding said housing co-axially therewith, means connecting one of said rings to said propeller to be turned thereby, and means interconnecting said rings whereby each is turned through a predetermined partial revolution whenever an adjacent ring is turned through a full revolution.

8. In a meter of the character described, a housing comprising a sleeve and a tubular body disposed co-axially there-inside, registering means comprising a plurality of rings revolubly mounted upon said body, indicia on each of said rings successively visible through a window in said sleeve as the associated ring turns, means interconnecting said rings whereby each is turned to bring its next successive indicium into register with said window when an adjacent ring is turned through a predetermined arc, means mounted within the bore of said body in position to be moved by fluid flowing therethrough, and means connecting the first of said rings to said fluid-moved means to be moved thereby.

9. In a meter of the character described, a housing comprising a sleeve and a tubular body disposed co-axially there-inside, registering means comprising a plurality of rings revolubly mounted upon said body, disposed circumferentially of and between said sleeve and said tubular body, indicia on each of said rings successively visible through a window in said sleeve as the associated ring turns, means interconnecting said rings whereby each is turned to bring its next successive indicium into register with said window when an adjacent ring is turned through a predetermined distance, means mounted within the bore of said body in position to be moved by fluid flowing therethrough, and means connecting the first of said rings to said fluid-moved means to be moved thereby.

10. In a meter of the character described, a tubular housing having a bore of substantially uniform diameter arranged for passage of liquid axially therethrough, means for connecting said housing to a conduit as a continuation thereof, means disposed entirely within said bore and movable by fluid flowing therethrough axially of said housing proportionately with the quantity of fluid flowing therepast, and registering means concentrically surrounding said housing and extending axially therealong actuated by said fluid-moved means.

RUSSEL ESTEP.